(12) United States Patent
Hanes et al.

(10) Patent No.: US 7,734,742 B2
(45) Date of Patent: Jun. 8, 2010

(54) NETWORK-ATTACHED STORAGE DEVICE CONFIGURATION

(75) Inventors: David H. Hanes, Loveland, CO (US); Charles M. McJilton, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 11/830,123

(22) Filed: Jul. 30, 2007

(65) Prior Publication Data

US 2009/0037560 A1 Feb. 5, 2009

(51) Int. Cl.
*G06F 13/00* (2006.01)

(52) U.S. Cl. .................... 709/221; 709/213; 709/217; 709/226

(58) Field of Classification Search ................. 709/213, 709/214, 215, 216, 217, 219, 223, 224, 226, 709/220, 221, 222
See application file for complete search history.

(56) References Cited

U.S. PATENT DOCUMENTS

| | | | |
|---|---|---|---|
| 2002/0133539 A1* | 9/2002 | Monday | 709/203 |
| 2002/0147797 A1 | 10/2002 | Paul | |
| 2004/0210649 A1* | 10/2004 | Bhogal et al. | 709/222 |
| 2006/0117132 A1 | 6/2006 | Gray et al. | |
| 2008/0046567 A1* | 2/2008 | Watson et al. | 709/226 |

* cited by examiner

*Primary Examiner*—Viet Vu

(57) ABSTRACT

A system comprises a computer configured using a configuration setting and a network-attached storage (NAS) device coupled to the computer via a network. The NAS device receives the configuration setting from the computer via the network and configures the NAS device using the configuration setting.

16 Claims, 1 Drawing Sheet

NETWORK-ATTACHED STORAGE DEVICE CONFIGURATION

BACKGROUND

Networking various computers, printers, network-attached storage (NAS) devices, and other types of devices is ubiquitous. Implementing computer networks is becoming popular in small offices and home environments. The NAS device comprises a hard disk drive that is shareable by the computers on the network. To be used on a network, a NAS is first configured. Configuring the NAS generally comprises specifying such settings as time of day, date, language, and one or more security settings. Configuring the NAS device, however, may be a challenge for many users.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
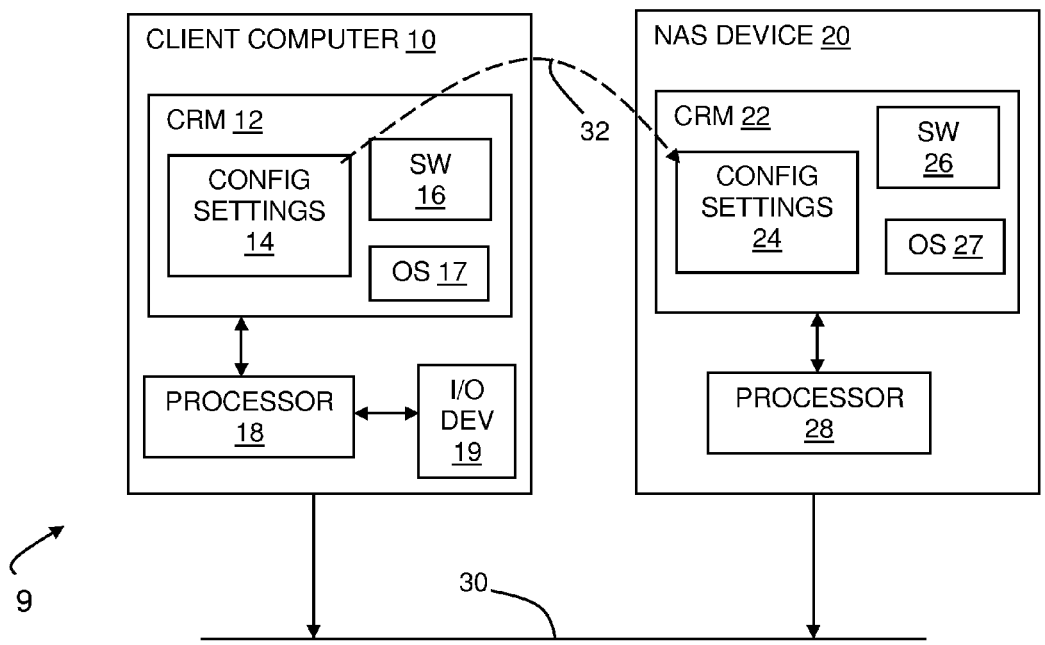
FIG. 1 shows a system in accordance with various embodiments.

FIG. 1 shows a system 9 in accordance with various embodiments. As shown, system 9 comprises a client computer 10 communicatively coupled to a network-attached storage 20 via a network 30. In some embodiments, the network 30 comprises a local area network (LAN), wide area network (WAN) such as the Internet, or combinations thereof. The client computer 10 may comprise a server, a portable computer (e.g., notebook, hand-held), a desktop computer, etc. The computer 10 comprises a processor 18 coupled to a computer-readable medium (CRM) 12 and one or more input/output (I/O) devices 19. The I/O devices 19 comprise any one or more of pointing devices (e.g., mouse, trackball), a keyboard, a display, etc. The computer-readable medium 12 comprises volatile memory (e.g., random access memory), non-volatile storage (e.g., hard disk drive, Flash memory, any form of read-only memory (ROM), compact disk read-only memory (CD ROM), etc.), and combinations thereof. The computer-readable medium 12 comprises one or more configuration settings 14, software 16, and an operating system (OS) 17. The software 16 and OS 17 are executed by the computer's processor 18. The software 16 provides the computer with some or all of the functionality attributed herein to the computer 10.

The configuration settings 14 comprise various settings that are used to configure, for example, the operating system 17 of the computer 10. Examples of such configuration settings comprise: a language, a time zone, time, date, daylight savings adjustment, network workgroup name, a security setting (e.g., a password), an account setting, and a preference. In some embodiments, the configuration settings 14 for the computer 10 are set during initial set-up of the computer (e.g., upon enabling power and loading the computer's operating system for the first time). In other embodiments, the configuration settings 14 of the computer are specified by a user of the computer 10 running a utility program for that purpose.

The NAS device 20 also comprises a processor 28 coupled to a computer-readable medium 22. While in some embodiments, the NAS 20 comprises an I/O device (e.g., mouse, keyboard, display), in other embodiments, the NAS 20 does not comprise such typical user I/O devices. In such latter embodiments, the NAS device 20 is referred to as "head-less." In at least some embodiments, the headless NAS 20 has no connections for connecting a computer input device (e.g., keyboard, mouse, trackball, etc.) or a computer monitor. In other embodiments, headless means that, while ports may be provided for such standard input and output devices, no such standard input and output devices are coupled to or used with the NAS device 20.

The computer-readable medium 22 of the NAS device 20 contains software 26 and an operating system 27. The software 26 and OS 27 are executed by the NAS' processor 28. The software 26 provides the NAS with some or all of the functionality attributed herein to the NAS 20.

The NAS device 20 also is configured with one more configuration settings 24. In accordance with at least some embodiments, one or more of the computer's configuration settings 14 are also usable to configure the NAS device 20. Examples of configuration settings applicable to both the computer 10 and NAS device 20 comprise: a language, a time zone, time, date, daylight savings adjustment, network workgroup name, a security setting (e.g., a password), an account setting, and a preference. In some embodiments, one or more, but not necessarily all, of the computer's configuration settings 14 are used to also configure the NAS device 20. In various embodiments, all of the computer's configuration settings 14 are used to configure the NAS device 20.

The software 16 is encoded with information as to which of the computer's configuration settings 14 are applicable to the NAS device 20. In some embodiments, the software 16 transmits the computer's configuration applicable to the NAS device 20 in the form of an XML (extended mark-up language) file. If information is included in the XML that is not useful to the NAS device 20, the NAS device selects the fields of information from the XML that are useful.

Dashed arrow 32 illustrates that one or more of the computer's configuration settings 14 are provided to the NAS device 20 for configuring the NAS device. In various embodiments, the computer's configuration settings used to configure the NAS device 20 are transmitted over the network 30.

Figure 2:
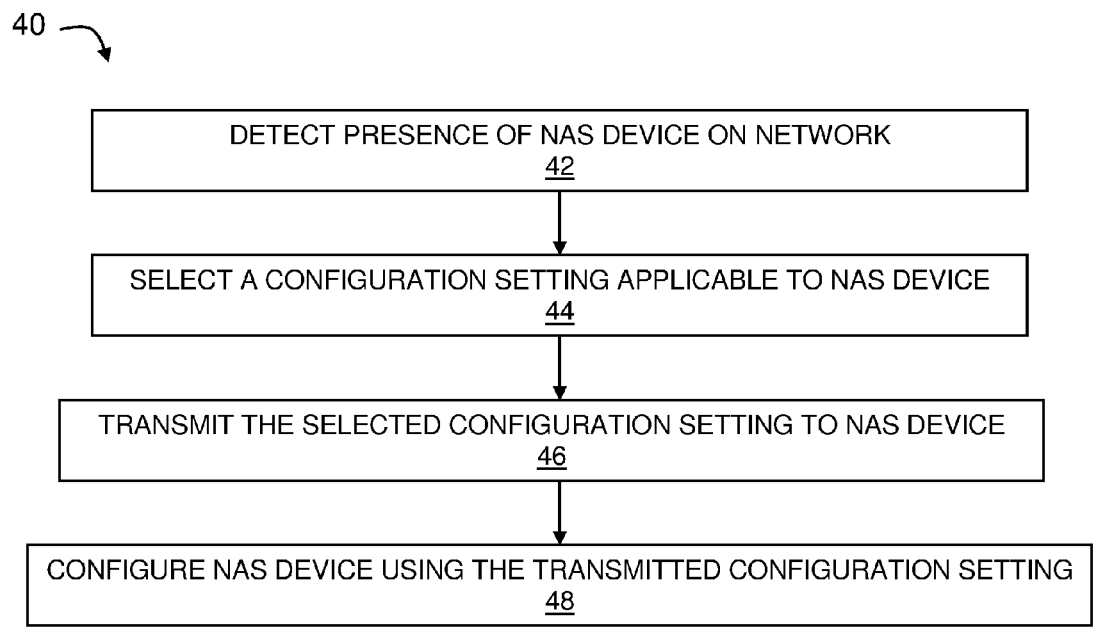
FIG. 2 shows a method in accordance with various embodiments.

FIG. 2 illustrates a method 40 in accordance with various embodiments. The various actions depicted in FIG. 2 can be performed in an order different from that shown. Further, two or more of the actions depicted in FIG. 2 can be performed together or in parallel. The method 40 of FIG. 2 may be performed upon a user loading the software 16 into the client computer 10. For example, upon purchase of the NAS device 20, the user may also have purchased software 16 (software 26 may be pre-loaded on NAS device 20 at the factory). The software 16 may be provided on a CD ROM, or other type of non-volatile storage. Software 16 may be also be downloaded from the Internet. At any rate, the user causes the software 16 to be loaded and installed on the client computer 10. Once installed, the software 16 may automatically perform one or more of the actions shown in FIG. 2 attributed to the computer.

At 42, method 40 comprises the computer 10 detecting the presence of the NAS device 20 on the network 30. This detection process may be performed by, for example, use of the Simple Service Discovery Protocol (SSDP). At 44, the computer 10 comprises selecting a configuration setting from among the computer's settings 14 that is also applicable to the NAS device 20. In some embodiments, only a single configuration setting is selected, while in other embodiments, multiple, but not all settings are selected. In yet other embodiments, all of the computer's configuration settings 14 are selected. At 46, the method 40 comprises the computer 10 transmitting the selected configuration setting(s) to the NAS device 20. At 48, the NAS device 20 (under control of its software 26), receives and uses the transmitted setting to configure the NAS device.

Other than causing the software 16 to be loaded into the computer 10, in various embodiments, the method of selecting a configuration setting 14 to be transmitted to and used to configure the NAS device 20 is performed automatically (i.e., without user involvement). In other embodiments, a user may be prompted via I/O device 19 for authorization for the computer 10 to configure the NAS device. In some embodiments, a user 'clicks' an "OK" button on a display, after which the computer performs the configuration setting selection and transmission actions described above.

In some embodiments, not all of the configuration items needed to configure the NAS device 20 are provided by the computer 10. For example, the NAS device 20 may need to be configured in a certain way that is not applicable to the computer 10, and thus the computer 10 does not have that particular configuration item. In such embodiments, the software 16 running on the computer 10 prompts the user via the I/O device 19 to provide one or more configuration settings, which the computer 10 then transmits over the network 30 to the NAS device 20. The NAS device 20 receives these user-provided configuration settings and configures itself with such settings. In some embodiments, the software 16 asks the user a series of questions or provides choices to the user. Based on the answer to the questions or the selection made by the user of the choices, the computer 10 determines and provides the configuration settings to the NAS device 20. The computer 10 prompts the user for such configuration settings before, during, or after automatically providing the NAS device 20 with the configuration settings that are common between the computer and the NAS device.

In some embodiments, the configuration of the NAS device 20 as described herein is performed automatically during initialization of the computer 10, initialization of the NAS device 20, or during loading of the software 16. In other embodiments, the NAS device configuration is performed upon request by a user causing software 16 to be executed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a computer configured according to a first configuration setting; and
    a network-attached storage (NAS) device coupled to said computer via a network, wherein without user involvement said NAS device receives said first configuration setting from said computer via said network and configures the NAS device according to said first configuration setting;
    wherein in addition to the first configuration setting said computer also prompts a user for a second configuration setting and provides said second configuration setting to said NAS device which configures itself according to said second configuration setting.

2. The system of claim 1 wherein said first configuration setting comprises a setting selected from a group consisting of a language, a time zone, time, date, daylight savings adjustment, network workgroup name, security setting, account setting, and a preference.

3. The system of claim 1 wherein said computer is configured using a plurality of configuration settings, including said first configuration setting, and said NAS device configures itself using at least two of said plurality of said configuration settings received over said network.

4. The system of claim 1 wherein said computer is configured using a plurality of configuration settings, including said first configuration setting, and said NAS device configures itself using all of said plurality of said configuration settings received over said network.

5. The system of claim 1 wherein said computer prompts a user for authorization for the computer to transmit said first configuration setting to said NAS device.

6. The system of claim 1 further comprising software that, upon being loaded onto said computer, causes said computer to automatically transmit said first configuration setting to said NAS device.

7. A method, comprising:
    selecting, without user involvement, a configuration setting implemented on a computer, said selected configuration setting applicable to a network-attached storage (NAS) device;
    transmitting, without user involvement, said selected configuration setting to said NAS device via a network;
    prompting a user for an additional configuration setting;
    receiving said additional configuration setting from said user; and
    transmitting said additional configuration setting to said NAS.

8. The method of claim 7 further comprising detecting presence on said network of said NAS device.

9. The method of claim 7 wherein selecting the configuration setting comprises selecting a configuration setting from a group consisting of a language, a time zone, time, date, daylight savings adjustment, network workgroup name, security setting, account setting, and a preference.

10. The method of claim 7 further comprising configuring said NAS device using said selected and said additional configuration settings.

11. The method of claim 7 further comprising prompting a user for authorization to select a configuration setting for transmission to said NAS device.

12. The method of claim 7 wherein selecting the configuration setting comprises selecting at least one, but not all, of a plurality of configuration settings implemented on said computer.

13. A computer-readable medium (CRM) comprising software that, when executed by a processor, causes the processor to:
- select, without user involvement, a configuration setting implemented on a computer, said selected configuration setting applicable to a network-attached storage (NAS) device;
- transmit, without user involvement, said selected configuration setting to said NAS device via a network;
- prompt a user for an additional configuration setting;
- receive said additional configuration setting from said user; and
- transmit said additional configuration setting to said NAS.

14. The CRM of claim 13 wherein the software causing the processor to select the configuration causes the processor to select a configuration setting from a group consisting of a language, a time zone, time, date, daylight savings adjustment, network workgroup name, security setting, account setting, and a preference.

15. The CRM of claim 13 wherein the software further causes the processor to prompt a user for authorization to select a configuration setting for transmission to said NAS device.

16. The CRM of claim 13 wherein the software causing the processor to select the configuration causes the processor to select at least one, but not all, of a plurality of configuration settings implemented on said computer.

* * * * *